Figure 3:
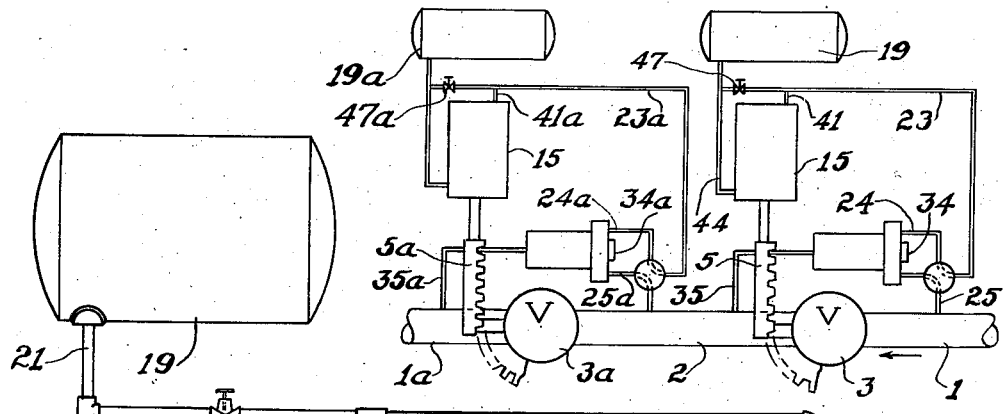

Aug. 7, 1945.  E. E. HEDENE  2,381,447
FLUID PRESSURE OPERATED VALVE
Filed May 25, 1942  2 Sheets-Sheet 1

Inventor
Edwin E. Hedene
By Lewis D. Konigsford
Attorney

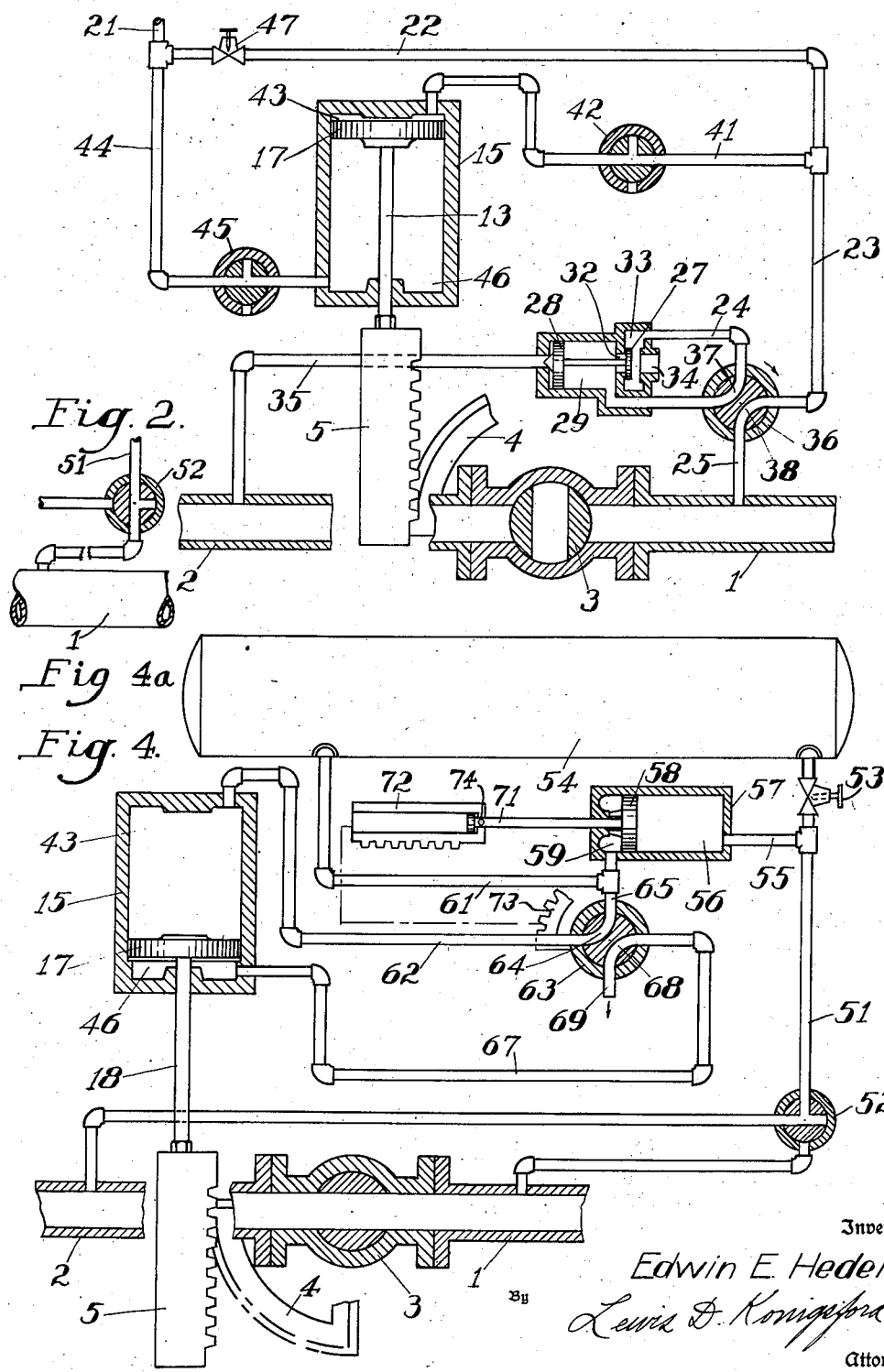

Patented Aug. 7, 1945

2,381,447

UNITED STATES PATENT OFFICE 2,381,447

FLUID PRESSURE OPERATED VALVE

Edwin E. Hedene, Oakland, Calif., assignor to Merco Nordstrom Valve Company, Pittsburgh, Pa., a corporation of Delaware Application May 25, 1942, Serial No. 444,335

4 Claims. (Cl. 137—153)

The present invention relates to fluid operated check valves for use on gas distribution mains or the like.

This is a continuation-in-part of my United States Letters Patent No. 2,302,370, granted November 17, 1942, which was co-pending herewith.

In a pipe line employed for transmission of gas, it is desirable to employ valves at water crossings or at other intervals in the line which will close automatically in event of a break in the line to isolate the broken portion of the line and thus eliminate the possibility of large losses of gas, or the danger of explosions where combustible gases are transported. It has been proposed to install valves in such lines which are operated by pressure differences in the line. However, the normal flow in such lines is not steady, as it is the general practice to supply gas to the line at a constant rate throughout the day and night period and allow the line pressure to fluctuate in accordance with the demand. It is not desired that these normal changes in pressure which develop in the line should operate the automatic closing valve.

It is an object of this invention to provide a check valve which will be operated automatically to close the line in which it is connected should a sudden drop in pressure occur in the line, such as would be caused by a break, while normal fluctuations in pressure and in rate of flow in the line will not effect operation of the valve.

A further object is the provision of a valve automatically operated by power means to close in event of a break occurring in the line in which the valve is connected, and which will not automatically open the valve when pressure is restored.

Another object is the provision of an automatically operating check valve which will close upon a break occurring in an adjacent pipe line section upstream or downstream of the valve.

Another object is the provision of an automatically operating check valve which is simple in construction and reliable in operation, and is inexpensive to manufacture.

Accordingly, in one embodiment of the present invention, I provide automatic fluid pressure operating means for a valve which is actuated by a rate of static pressure change in the line above a predetermined minimum to close the valve, and wherein a fluid pressure actuated valve controls connection between the pipe line and said means to thereafter prevent operation of said valve. In the preferred embodiment of the invention, I employ a valve operated by a piston in a cylinder in which I maintain balanced or substantially balanced pressures on the two sides of the piston through a choke or throttling orifice adjusted so that normal fluctuations in pressure in the pipe line can adjust themselves across the piston by flow through the orifice while abnormally rapid changes in pressure will cause a sufficient pressure differential across the piston to operate the piston to close the valve. A reservoir may be provided on one side of the throttling orifice to maintain a sufficient volume of fluid under pressure to secure the desired operation. The valve employed preferably is of the static pressure balanced type, as for example, a rotary plug valve or double seat globe type valve or the like.

In another embodiment of the invention the piston and cylinder for operating the valve are selectively connected to a source of pressure by a distributor valve so as to actuate the piston in valve closing direction, and the distributor valve is actuated by rapid changes in pressure to cause actuation of the piston, and a one-way connection between the distributor valve and its actuating means prevents reopening of the main valve when pressure is restored in the pipe line.

Figure 1:
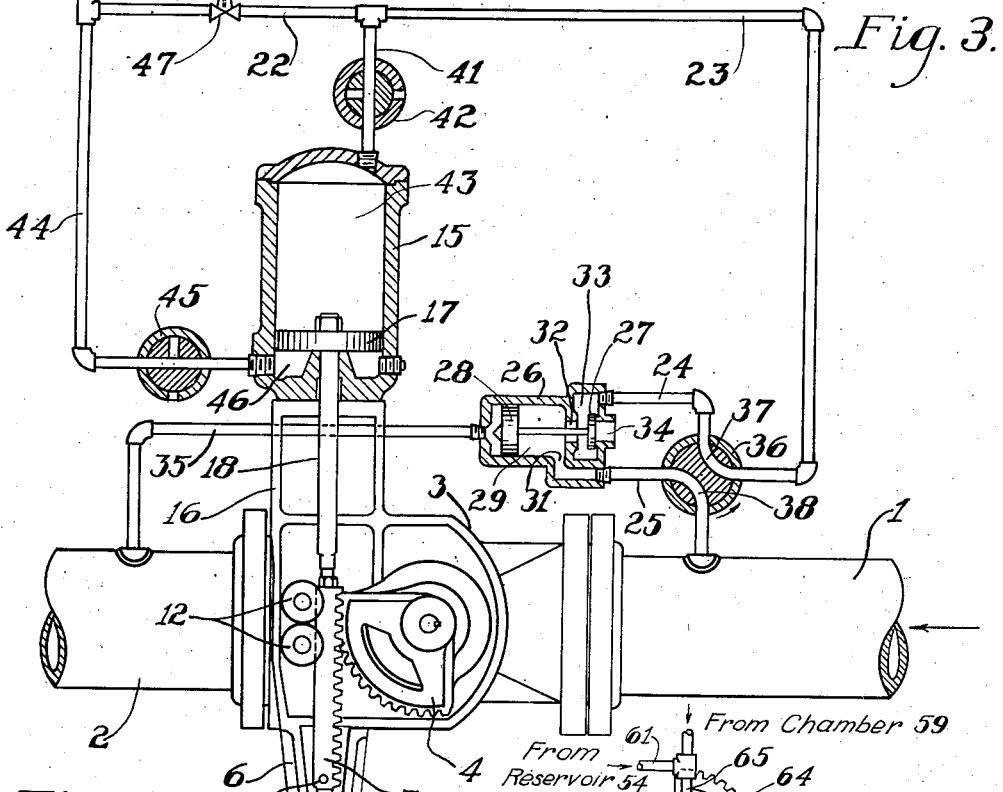
Figure 5:
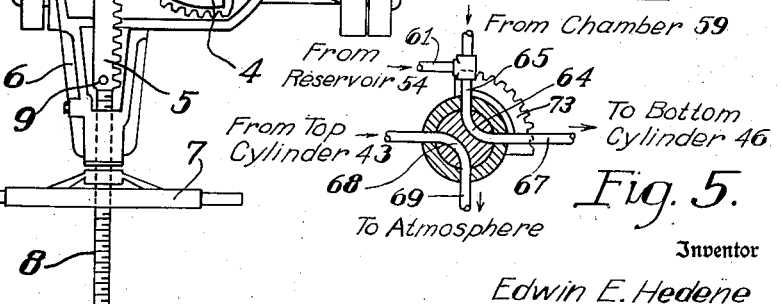

The invention will be described in greater detail in the following specifications taken in connection with the accompanying drawings, wherein preferred embodiments of the invention are shown by way of illustration, and wherein:

Figure 1 is a partly diagrammatic view showing the preferred embodiment of my invention applied to a pipe line in which the main valve is in open position, Figure 2 is a view similar to Figure 1 in which the main valve is shown in closed position after a break occurs, Figure 3 is a diagrammatic view showing the invention applied to the ends of a pipe line section, Figure 4 is a partly diagrammatic view showing a modification, Figure 4a is a detail of Figure 4, and Figure 5 shows another detail of Figure 4.

Referring to Figure 1 of the drawings, wherein the invention is partly diagrammatically illustrated, there is shown a pipe line comprising an upstream portion 1 and a downstream portion 2 having a valve indicated generally at 3 interposed therebetween. As shown, this valve preferably is of the rotary plug type and has a gear segment 4 secured to its stem adapted to be operated by a gear rack 5. A bracket 6, suitably supported by the valve casing or cover, carries a hand wheel 7 and a threaded rod 8 is secured at one end to rack 5 by a removable pin 9, whereby the valve may be manually operated. Pin 9 is removed when it is desired to operate the valve automatically. Rollers 12 secured to the cover may be provided to support the rack 5 in engagement with the gear segment 4. A cylinder 15 is suitably supported by a bracket 16 extending from the casing of valve 3 and has piston 17 therein connected by a rod 18 in any suitable manner to the rack 5.

A reservoir 19 is provided which normally is maintained at the same pressure as the pipeline, and is supplied with gas by means of conduits 21, 22, 23, 24 and 25 when they are in connected relation as shown in Figure 1. A housing 26 contains a valve 27 connected to or controlled by a piston 28 acting in a cylinder 29, and if desired a spring may be located between the piston and cylinder head to provide an initial base for piston 28 to close port 34. At one end cylinder 29 is connected by a port 31 to conduit 25, and also by a port 32 and chamber 33 also has a port 34 opening to the atmosphere which, as shown in Figure 1, is normally closed by valve 27 when the main valve 3 is open. At its opposite end, cylinder 29 connects on the opposite side of piston 28 by a conduit 35 to the main 2, downstream from valve 3. A valve 36, which preferably is of the four-way multiport plug type, is connected in the conduits 24 and 25 and has passageways 37 and 38 in the plug forming in the position shown in Figure 1 a continuation of conduits 24 and 25 respectively. A conduit 41 having a manually operable multiport valve 42 therein, preferably of the three-way plug type, connects conduit 23 with an end chamber 43 of cylinder 15, and a conduit 44 having a similar multiport valve 45 therein connects conduit 21 and reservoir 19 with the end chamber 46 of the cylinder 15. The end chamber 43 of cylinder 15 thus is connected by conduits 41, 23, 37, 24, chamber 33, port 32, chamber 29, port 31, conduit 25 and passage 38 to the section 1 of the pipe line upstream from valve 3, and the reservoir 19 is similarly connected through conduits 21 and 22 and throttle valve 47 and conduits 23, etc. with the pipe line section 1.

The operation of the apparatus now will be described. Referring to Figure 3, it will be seen that the section of pipe has an upstream valve 3 and a downstream valve 3a at its ends, the downstream pipe section from valve 3a being designated as 1a. In Figures 1 and 3, assuming pin 9 removed and the system and reservoirs 19 and 19a filled with gas, the parts are shown in normal position ready for operation to close the main line valves 3 and 3a should a break occur in section 2. Referring to Figure 1, the pressures conducted by conduits 35 and 25 to the two sides of piston 28 are substantially equal, and as valve 27 is exposed on one side to atmosphere and has the bias of the spring (if a spring is employed) it will be held in position to close port 34 as shown in Figure 1. Gas has been supplied to chamber 43 by conduit 25, port 31, chamber 33, chamber 29, port 32, and conduits 24, 37, 23 and 41, and to reservoir 19 by conduit 22 through throttle valve 47 and conduit 21, and gas was supplied to chamber 46 from reservoir 19 through conduits 21 and 44. The pressures on opposite sides of piston 17 thus are substantially equal as there is no flow through throttle valve 47, and the piston 17 is balanced ready for operation.

Should the pressure fall rapidly on the downstream side of valve 3 due to a break in main 2, piston 28 with valve 27 will remain at first in the position shown in Figure 1 closing port 34. Gas now will flow from chamber 43 in cylinder 15 through conduits 41, 23, port 37 and conduit 24 into chamber 33 and through ports 32, 31 and conduits 25 and 38 into main 1. Gas also will flow from chamber 46 through conduit 44, throttle valve 47 into conduit 23, etc. into main 1, but because of the restriction 47 the pressure in chamber 46 remains higher than the pressure in chamber 43. The pressure on opposite sides of piston 17 thus becomes unbalanced and the pressure in chamber 46 acts to raise the piston and thus move rack 5 to close valve 3.

The closing of valve 3 arrests the drop in pressure in main 1 and may increase the fall in pressure in main 2 because gas is no longer being supplied thereto from main 1. The pressure in conduit 35 and in chamber 29 to the left of piston 28 thus continues to fall while the pressure in conduit 25 and in chamber 29 to the right of piston 28 builds up until the differential across piston 28 moves it and valve member 27 to the left, thus closing port 32 and opening port 34, so that the reservoir 19 and chambers 46 and 43 exhaust to the atmosphere through conduits 23, 37, 24, chamber 33 and port 34. Valve 3 thus cannot be opened automatically by piston 17.

When it is desired to open valve 3, valve 36 is manually turned to the position shown in Figure 2 and chamber 43 becomes subject to the pressure in main 1 through conduits 41, 23, 38 and 25. A flow also occurs from conduit 23 and 22 through throttle valve 47 and conduit 44 into chamber 46, but by reason of the restriction 47 the pressure in chamber 43 builds up more rapidly than the pressure in chamber 46 and the differential moves piston 17 downward to open valve 3. Flow also occurs into reservoir 19 through conduit 21, valve 47 from conduit 22 until the reservoir is refilled, at which time the pressure in chambers 43 and 46 become substantially equal. The break in main 2 having been repaired, the pressure will build up until the pressure in conduit 35 is sufficient to move piston 28 to the right to open port 32 and close port 34, and then valve 36 may be turned manually to the position shown in Figure 1 so the apparatus will be in condition for emergency operation again.

Referring to Figure 3, in the similar operating mechanism for valve 3a on the downstream end of main section 2, the fall in pressure in main 1 will cause a bleed from chamber 43 through conduits 41a, 23a, 24a and 25a into main 2 faster than the flow through throttle valve 47a, thus causing a lowering of pressure in chamber 43 so that the pressure in chamber 46 operates the piston 17 and rack 5a to close the valve 3a. The closing of valve 3a stabilizes the pressure in main 1a while the pressure in main 2 continues to fall until substantially atmospheric pressure is attained in main 2, reservoir 19a, chambers 43 and 46 and the conduits connected thereto. The valve 3a cannot be operated until valve 3 is opened as previously described, to restore the pressure in main 2. When this occurs gas flows through conduits 25a, 24a, 23a and 41a into chamber 43 as previously described to operate piston 17 and open valve 3a and to fill reservoir 19a. It will thus be seen that the valves 3 and 3a at the two ends of main section 2 will be closed automatically upon the occurrence of a break in the main 2 to isolate the broken section from the rest of the pipe line.

Should it be desired to fill the reservoir 19 without operating the piston 17, the valves 42 and 45 are turned to vent chambers 43 and 46 to the atmosphere and disconnect conduits 41 and 44 from the chambers 43 and 46 respectively. The reservoir then can be filled by turning valve 36 to the position shown in Figure 2.

In the modification shown in Figure 4, wherein like parts are correspondingly numbered, a conduit 51 having a switching valve 52 therein connects through a throttle valve 53 with the reservoir 54. Conduit 51 is connected by conduit 55 to one chamber 56 of a pilot valve cylinder 57 having a pilot valve operating piston 58 therein, the chamber 59 on the opposite side of piston 58 being connected by a conduit 61 to the reservoir 54. The chamber 43 of main cylinder 15 is connected by conduit 62 to a four-way valve 63 and by port 64 therein and conduits 65 and 61 to the reservoir 54. The other chamber 46 of cylinder 15 is connected by conduit 67 to the port 68 of valve 63 which opens to atmosphere at 69. Piston 58 is connected to a rod 71 which is connected to rack 72 with a lost motion connection so that rack 72 may be moved thereby to the right but cannot be moved to the left. Rack 72 is connected to a gear segment 73 or the like to actuate four-way valve 63 in one direction, so that an unbalance of pressures in chambers 56 and 59 which causes piston 58 to move to the right will rotate valve 63 clockwise to the position shown in Figure 5.

In operation, the mechanism being in the position shown in Figure 4, should a break occur in main 2 the drop in static pressure transmitted into main 1 will cause a flow of gas from chamber 56 through conduits 55 and 51 into main 1, thus allowing the pressure in chamber 59 from reservoir 54 to move piston 58 to the right and rotate pilot valve 63 clockwise for ninety degrees to the position shown in Figure 5. Piston 58 will respond to a relatively low differential between chambers 59 and 56, and the adjustment of valve 53 is such that normal fluctuations in pressure in main 1 will not be sufficient to move piston 58. Movement of valve 63 causes reservoir 54 to be connected, through conduits 61, 65, port 64 and conduit 67 to the bottom chamber 46 of cylinder 15 while at the same time the top chamber 43 of cylinder 15 is connected by conduit 62, port 68 and conduit 69 to atmosphere, so that the pressure in chamber 46 actuates piston 17 to close valve 3, and the reservoir 54 will bleed to atmospheric pressure through conduit 51 and main 2. On the downstream side the same action occurs to close the valve 3a, but the reservoir does not bleed to atmospheric pressure. The closing of valve 3a arrests the bleed from chamber 56 and should the pressure in main 1a be higher than the residual pressure in the reservoir, piston 58 will be moved to the left to the position shown in Figure 4. However, due to the lost motion between piston rod 71 and rack 72 the pilot valve 63 will not be rotated and valve 3a will remain closed.

The specific subject matter of Figure 4 is disclosed and is being claimed in my co-pending application Serial No. 455,997, filed August 25, 1942. After the break has been repaired, the valve 63 is manually restored to the position shown in Figure 4, thus allowing the pressure in chamber 46 to exhaust to atmosphere, while the pressure in chamber 43 from reservoir 54 moves piston 17 down to open valve 3. Should the pressure in reservoir 54 be insufficient for this purpose, valve 52 is turned to the position shown in Figure 4a to connect the reservoir with main 1 to build up the pressure therein. On the downstream end of main 2, when valve 63 is manually rotated, the pressure in reservoir 54 will probably be sufficient to move piston 17 to open the downstream valve in a similar manner to valve 3.

Valve 52 is provided to allow filling of reservoir 54 with gas from the upstream or downstream side.

Various modifications may be made without departing from the spirit or scope of the invention.

What I claim as my invention and desire to secure by United States Letters Patent is:

1. In a fluid distribution system, the combination of a pipe line, a main valve interposed in said pipe line, power means for actuating said main valve, means responsive to rate of pressure change within the pipe line for actuating said power means, and a fluid pressure operated valve controlling said latter means to disconnect said latter means from the pipe line upon closing operation of said main valve.

2. The combination comprising a main valve adapted to be interposed in a pipe line, power means for actuating said valve, means responsive to rate of pressure change within the pipe line for operating said power means, a fluid pressure operated valve controlling said latter means to disconnect said latter means from the pipe line upon closing operation of said main valve, and a switching valve to bypass said valve controlling said latter means.

3. The combination comprising a main valve adapted to be interposed in a pipe line, a reversible fluid pressure motor having inlet and outlet connections, a conduit between said connections, a throttle valve in said conduit, a conduit connected to the first mentioned conduit and adapted to be connected to said pipe line, a reservoir connected to said first conduit on the opposite side of said throttle valve, a vent valve in said second conduit having an atmospheric port controlled thereby, fluid pressure actuated means retaining said vent valve in position to close the atmospheric port, and a valve controlled bypass around said latter valve to connect said pipe line to said reservoir.

4. The combination comprising a main valve adapted to be interposed in a pipe line, a reversible fluid pressure motor having inlet and outlet connections, a conduit between said connections, a throttle valve in said conduit, a conduit connected to the first mentioned conduit and adapted to be connected to said pipe line, a reservoir connected to said first conduit on the opposite side of said throttle valve, a vent valve in said second conduit having an atmospheric port controlled thereby, fluid pressure actuated means controlling said vent valve, conduits adapted to connect opposite sides of said latter means downstream and upstream of said main valve, and a valve controlled bypass around said vent valve to connect said pipe line to said reservoir.

EDWIN E. HEDENE.